US008443663B1

(12) United States Patent
Kramer

(10) Patent No.: US 8,443,663 B1
(45) Date of Patent: May 21, 2013

(54) NAVIGATIONAL AID FOR BOOM/MAINSAIL

(76) Inventor: Randall Anthony Kramer, Marion, IL (US)

(*) Notice: Subject to any disclaimer, the term of this patent is extended or adjusted under 35 U.S.C. 154(b) by 61 days.

(21) Appl. No.: 13/373,777

(22) Filed: Nov. 30, 2011

(51) Int. Cl.
 *G01C 21/00* (2006.01)
(52) U.S. Cl.
 USPC ..................................... 73/178 R; 73/170.03
(58) Field of Classification Search
 None
 See application file for complete search history.

(56) References Cited

U.S. PATENT DOCUMENTS

| | | | |
|---|---|---|---|
| 3,721,007 A | | 3/1973 | Banner |
| 3,824,947 A | | 7/1974 | Hondaranta et al. |
| 3,862,398 A | | 1/1975 | Toscan |
| 3,876,866 A | * | 4/1975 | Kaspar ........................ 235/88 R |
| 4,107,988 A | * | 8/1978 | Polsky ......................... 73/178 R |
| 4,140,077 A | * | 2/1979 | Eriksson ........................ 116/320 |
| 4,149,410 A | * | 4/1979 | Lonnroth .................... 73/178 R |
| 4,359,628 A | | 11/1982 | Lambert |
| 4,790,255 A | * | 12/1988 | Shively et al. .................. 114/97 |
| 4,855,577 A | * | 8/1989 | McLain ...................... 235/78 N |
| 7,814,784 B1 | * | 10/2010 | Swindell ..................... 73/178 R |
| 8,135,504 B2 | * | 3/2012 | Summers ......................... 701/21 |
| 2007/0157864 A1 | * | 7/2007 | Aldin et al. ................... 114/281 |
| 2012/0031319 A1 | * | 2/2012 | Jarke .......................... 114/102.1 |
| 2013/0042798 A1 | * | 2/2013 | Holohan et al. ............. 114/39.3 |

* cited by examiner

*Primary Examiner* — Andre Allen

(57) ABSTRACT

An embodiment of concentrically-mounted disks, designed for sailing, which can be used in conjunction with a navigational chart and/or a compass to calculate boom/mainsail angles in degrees relative to a sailboat's course heading, calculating all sailable compass headings. Calculations factored by transitioning boom/mainsail angles, apparent wind ratios, angle of attack, and the areo-hydrodynamics of sailing. Further providing depictions of course heading, relative position of boom/mainsail, apparent wind direction, and coordinates relative to a navigational chart.

10 Claims, 5 Drawing Sheets

NAVIGATIONAL AID FOR BOOM/MAINSAIL

BACKGROUND

Prior Art

Figure 1:
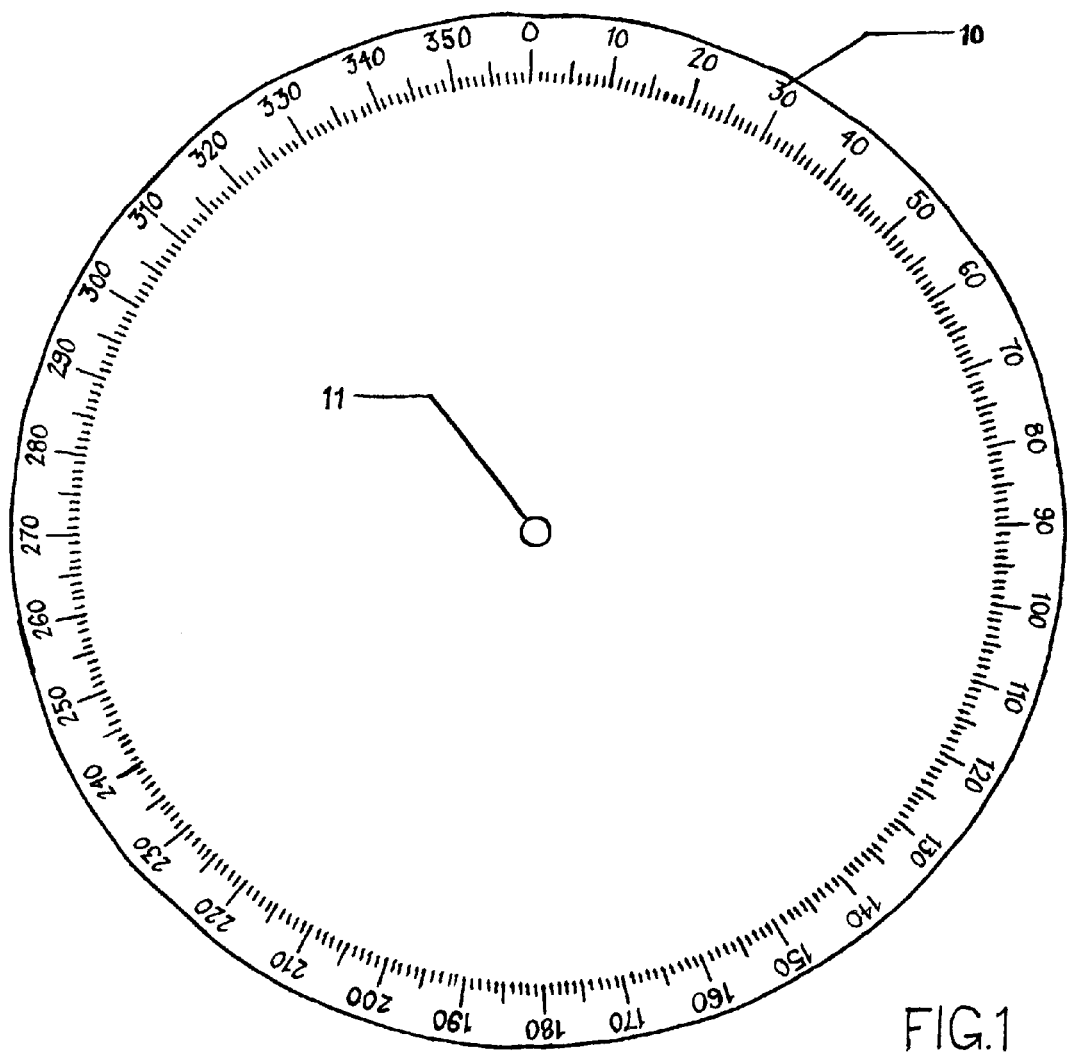

The following is a tabulation of some prior art that appears relevant:

U.S. Patents

| Pat. No. | Kind Code | Issue Date | Patentee |
| --- | --- | --- | --- |
| 7,814,784 | B1 | 2010 Oct. 19 | Swindell |
| 4,359,628 | B1 | 1982 Nov. 16 | Lambert |
| 3,862,398 | B1 | 1975 Jan. 21 | Toscan |
| 3,824,947 | B1 | 1974 Jul. 23 | Hondaranta et al. |
| 3,721,007 | B1 | 1973 Mar. 20 | Banner |

1. FIELD OF THE INVENTION

The invention calculates the angle to set the boom/mainsail for all sailable course headings applicable to any sailing vessel.

2. DESCRIPTION OF THE PRIOR ART

Applicant is unaware of any device in which the boom/mainsail angle is calculated. Prior art, U.S. Pat. No. 7,814,784 (2010) to Swindell, rotates 10 angles, known as 'Points of Sail," around a compass in an equivalence relation, as the two disks are symmetrical. These angles are names for specific degrees off the wind, and are proportionate on both 180° hemispheres of a circle. They are named as follows:

| | | | |
| --- | --- | --- | --- |
| 48° | close haul | 68° | close reach |
| 90° | beam reach | 135° | broad reach |
| 155° | run | | |

These degrees are not the boom/mainsail calculations for course headings, indicating only the name relative to the angular position of these 10 points of sail to true wind direction.

The ability to determine the various compass degrees for each of these names does not calculate the angle of the boom/main-sail, relative to the course heading. I have found the complex calculations needed to navigate the 270° of sailable course headings creates perplexing problems for the inexperienced small sailboat operator, or skipper of a new sailboat. These calculations further require the use of apparent wind, and not true wind, as in U.S. Pat. No. 7,814,784 to Swindell. True wind is only applicable to something stationary, motion+true wind=apparent wind.

3. SUMMARY

In accordance with one embodiment, this navigational aid, to be used in conjunction with a compass, or a navigational chart, factors apparent wind to quickly provide the necessary angle to set the boom/mainsail of a sailboat, further requiring no prior knowledge or use of points of sail. Embodiments include an operational boom/mainsail replica to utilize a predetermined numerical calculation ascertained by factors affecting sails. The result is an observable representation of the vessel's heading and boom/mainsail angle, applicable to a sailing vessel. This embodiment could save time and effort in getting a sailboat underway, with its ability to adjust a course heading, instead of making constant sail corrections, solving problems often encountered by novice sailors, and providing an alternate way of sailing for the experienced seaman.

4. ADVANTAGES

Accordingly, several advantages of one or more aspects are as follows: to provide a definitive angle for the boom/mainsail for all compass points, providing visual representation of angle, relative to the sailing vessel. The use of embodiments is independent of electronic equipment or other power requirements.

5. DRAWINGS

Figures

Figure 2:
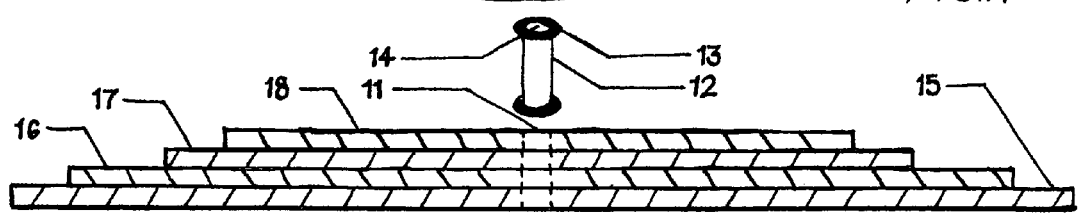
Figure 3:
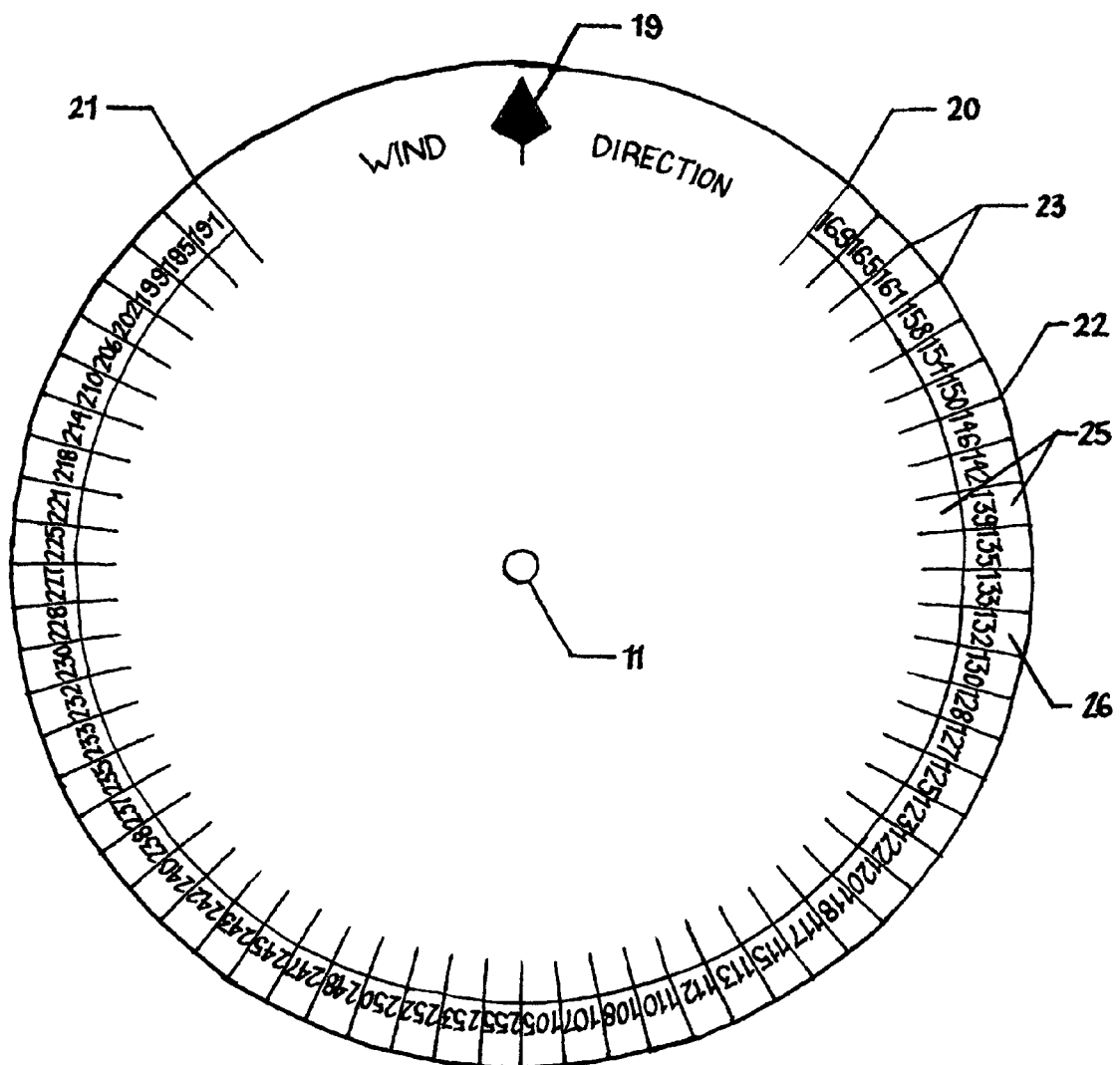
Figure 4:
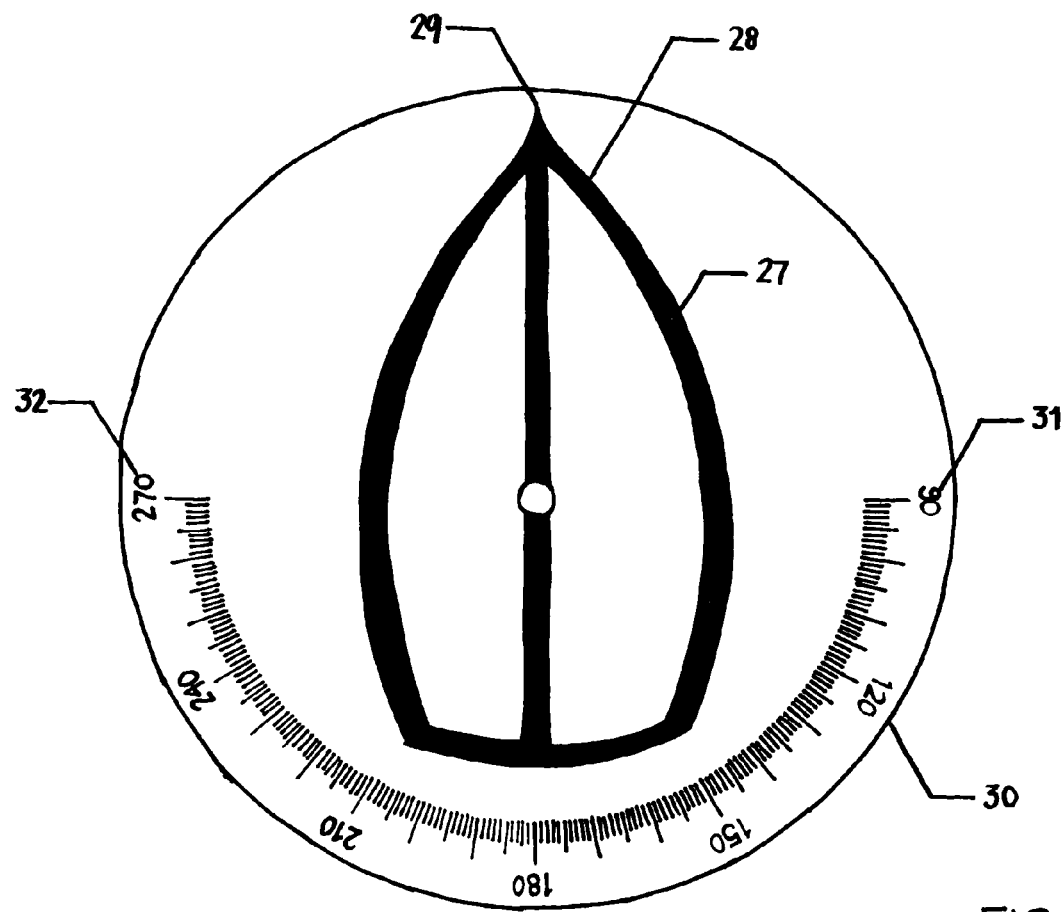
Figure 5:
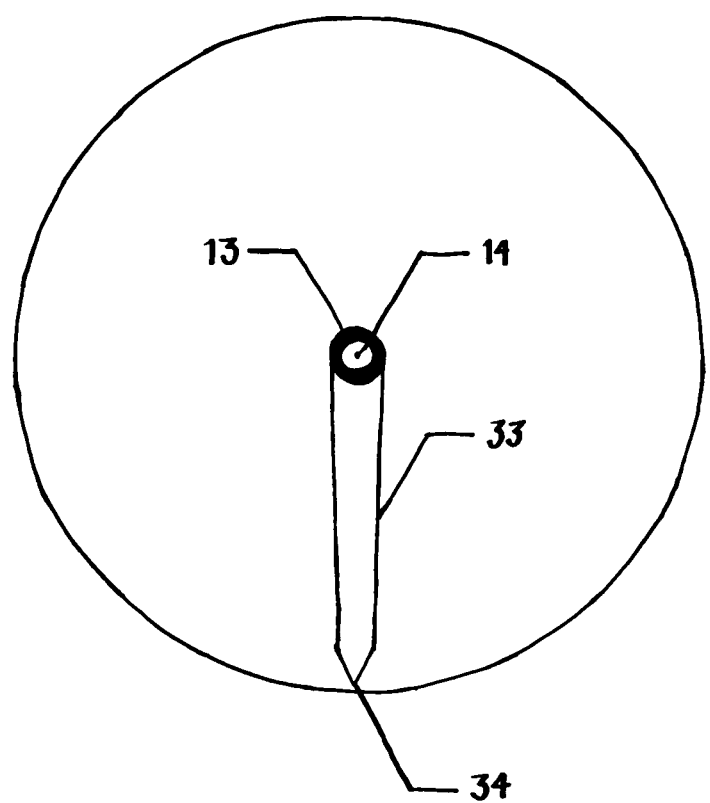
Figure 6:
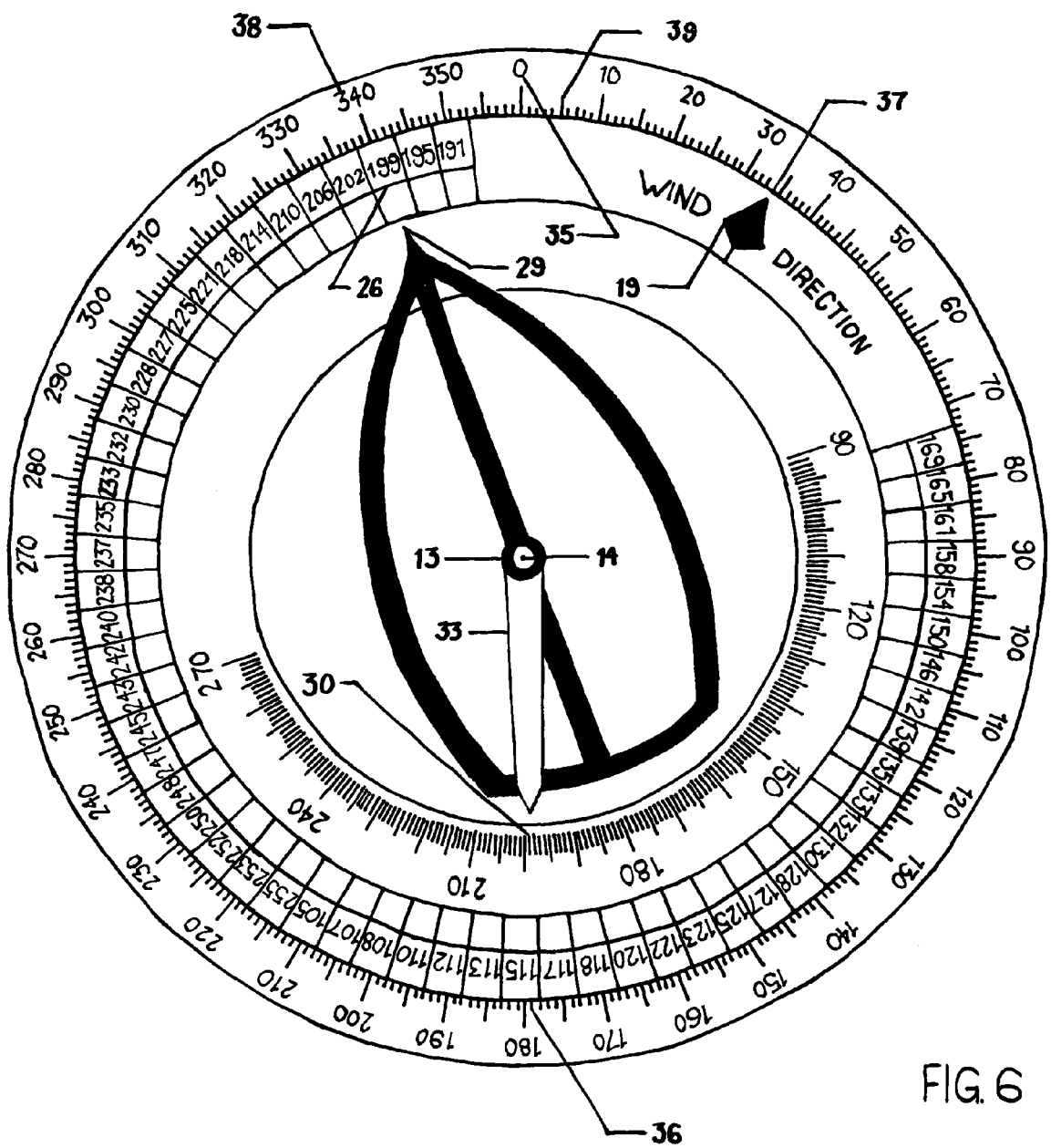

A fuller understanding of the nature and objects of the present invention will become apparent upon consideration of the following detailed description, taken in connection with the accompanying drawings, wherein:

FIG. 1 shows a top view of the bearing disk, depicting a nautical compass, including indicia from 0° to 359°;

FIG. 2 showing a side view of the entire embodiment; and,

FIG. 3 showing a top view of the variable disk, depicting the boom/mainsail angle calculations, and apparent wind indicator; and, FIG. 4 showing a top view of the boat disk, which provides a visual depiction of a sailboat, with the lower hemisphere being inscribed with a scale in degrees, from 90° to 270°, representing boom/mainsail angles relative to the sailboat; and, FIG. 5 showing a top view of the boom/mainsail disk, which shows a visual depiction of the boom/mainsail; and, FIG. 6 showing a top view of the assembled embodiment, further showing associations, and size variance between the disks.

6. DRAWINGS

Reference Numerals

| | | | |
| --- | --- | --- | --- |
| 10. | compass scale | 11. | common axis |
| 12. | bushing | 13. | retaining ring |
| 14. | central point | 15. | bearing disk periphery |
| 16. | veriable disk periphery | 17. | boat disk periphery |
| 18. | boom/mainsail disk periphery | 19. | arrowhead |
| 20. | 40° right of arrowhead | 21. | 40° left of arrowhead |
| 22. | perpendicular lines | 23. | 5° spacing |
| 24. | diametrically in half | 25. | two semi-identic spaces |
| 26. | predetermined calculation | 27. | hull of sailboat |
| 28. | bow | 29. | 0° mark |
| 30. | graduated scale | 31. | 90° |
| 32. | 270° | 33. | boom/mainsail |
| 34. | termination point | 35. | Magnetic North |
| 36. | line of position (degrees) | 37. | apparent wind compass point |
| 38. | course heading (bearing disk) | 39. | True North |

7. DETAILED DESCRIPTION

The present embodiment consists of four transparent, overlayed, relatively thin, flat, circular disks of descending size. A bearing disk, a variable disk, a boat disk, and a boom/mainsail disk. All disks are made from a waterproof, flexible material taken from a group consisting essentially of glass, plastic, silicone, and polyester, being retained in a juxtaposed, concentric axisymmetric relation, possessing the ability to rotate about a common axis.

FIG. 1 shows the bottom and largest disk, the bearing disk, which is marked on its periphery indicative of a nautical compass, comprising a scale of 360° 10. The common axis 11 being located equidistantly, providing radial adjustments.

FIG. 2 shows the side view of the disks, illustrating the relation between the disks, and their relation to the common axis 11, a bushing 12 which cooperates with the common axis, a retaining ring 13, securing placement and rotatability, and a central point 14, which provides a means of alignment. Further shown are the peripheries of the bearing disk 15, the variable disk 16, the boat disk 17, and the surface of the boom/mainsail disk 18.

FIG. 3 shows the variable disk, which is marked with a plurality of inscriptions 19,20,21,22,23,24,25,26. The first being an arrowhead 19, which is a means to indicate the current direction of the apparent wind. Commencing at 40° to the right 20 of the arrowhead, and continuing clockwise to 40° to the left 21 of the arrowhead, are divisional lines marked perpendicular to the perimeter 22, spaced at 5° increments 23, being further marked diametrically in half with a line 24 to provide two semi-identic spaces 25. The fifty-six spaces of the circumferential row containing a predetermined numerical calculation 26, factored by variations of transitioning boom/mainsail angles to apparent wind ratios.

FIG. 4 shows the boat disk, which is inscribed on the surface with a delineation comprising a hull of a sailboat 27, and a bow 28, culminating at a bowsprit which terminates at the perimeter indicating the 0° mark 29 of a 360° circle. The boat disk is further marked on its periphery with a graduated scale 30 in degrees, commencing at 90° 31, and terminating at 270° 32.

FIG. 5 shows the boom/mainsail disk. Inscribed on the surface is a delineation of a boom/mainsail 33, which terminates on the periphery 34, a mast being quintessentially represented by the retaining ring 13, and the central point 14.

FIG. 6 shows a number of embodiments. The following of which are functional when used in conjunction with a navigational chart (not shown). One embodiment is due to the completely transparent nature of the disks. When this embodiment is placed a top the navigational chart, the transparency provides a means of alignment with a compass rose (not shown), found on the navigational chart. Another embodiment in this configuration is the ability to adjust for any magnetic variations between True North 39, and Magnetic North 35, the degree of which varies from area to area. Another embodiment of this configuration is alignment of a current bearing with the central point 14, which provides a number of embodiments; the boom/mainsail 33 being trained on a landmark, on the chart, providing a line of position in compass degrees, on the bearing disk 36, required in obtaining a fix, also the determination of a new course heading by aiming the boat disk's 0° mark 29 directly at the destination on the navigational chart. Another embodiment is alignment of the apparent wind arrowhead 19, to its relative compass point on the bearing disk 37, providing a visual depiction of the apparent wind's direction on the embodiment and the navigational chart, which provides relationship to the surrounding area. Another embodiment is alignment of the sailboat's 0° mark 29 with a course heading on the bearing disk 38, providing visual confirmation of intended destination. Another embodiment is applying the predetermined numerical calculation 26 found sandwiched between the current heading 38, and the sailboat's 0° mark 29, providing an angle in degrees applicable to the graduated scale 30 on the boat disk. The angle, when applied to the boom/mainsail 33, would be the boom/mainsail angle required for a sailing vessel's boom/mainsail when sailing, that course heading 38, with the apparent wind emanating from illustrated compass direction 37.

In another embodiment, when used with a sailing vessel's compass, an operator aligning the course heading on the bearing disk 38, with the bow of the sailing vessel, the apparent wind arrowhead 19, by observing the winds effect on a telltale, a windvane, or any of the many ways of which to detect apparent wind direction, putting the embodiment in alignment with the sailing vessel. So aligned, ascertaining the boom/mainsail angle for a course change would merely require rotation of the boat disk to the desired course heading, and setting the sailing vessel's sails according to the predetermined numerical calculation 26. In another embodiment of this setting, is its use in point fixing. Keeping the course heading set on the bearing disk, while retaining alignment with the sailing vessel's bow, the boat disk's 0° mark, or boom/mainsail disk's boom/mainsail, being rotated toward a landmark would provide a compass point on the bearing disk 36, for ascertainment of a line of position degree for a current fix.

Thus the reader will see that at least one embodiment of this navigational aid provides a more reliable, lightweight, yet economical device that can be used by persons of almost any age.

While my above description contains many specificities, these should not be construed as limitations of the scope, but rather as exemplifications of several of the embodiments thereof. Many other variations are possible, including electronic rendering on computer, or slide rule, to name a few. Accordingly, the scope should be determined not by the embodiments illustrated, but by the appended claims and their equivalents.

I claim:

1. In a navigational aid of the type comprising four overlayed, relatively thin, flat, circular disks of varying size, being secured together by a means that allows rotatability about a common axis independently, retaining said disks in a juxtaposed, concentric relation;

a. a first disk is a bearing disk, marked indicative of a nautical compass, comprising a peripheral scale graduated in degrees;

b. a second disk, a variable disk, being of a lesser diameter than said bearing disk, is inscribed with a plurality of markings on a periphery, comprising an arrowhead to indicate apparent wind direction, 40° on either side of said arrowhead are fifty-seven equal dividing lines perpendicular to said periphery, which are further divided diametrically in half, providing fifty-six spaces, each space containing two semi-identic areas, comprised of an upper circumferential row, and a lower circumferential row, said upper circumferential row accommodating a predetermined numerical calculation, said predetermined numerical calculation means factored variations of transitioning boom/mainsail angles to apparent wind ratios;

c. a third disk, a boat disk, being of a lesser diameter than said variable disk, is inscribed on the surface with a delineation comprising a hull of a sailboat, a bow that culminates at a bowsprit which terminates at said boat disk's periphery indicating 0° of a 360° circle, further inscriptions on said periphery include a graduated scale, in degrees, commencing at 90° and terminating at 270°;

d. a fourth disk, a boom/mainsail disk, bears a depiction of a boom/mainsail emanating from said common axis, typifying a sailboat's mast.

2. The navigational aid as set forth in claim 1, wherein alignment of said arrowhead with an apparent wind direction, and said bearing disk with a sailing vessel's nautical compass, permitting rotation of said boat disk's bowsprit to indicate a desired course heading, between said desired course heading and said bowsprit, said predetermined numerical calculation would bear a boom/mainsail angle to necessitate said desired course heading.

3. The navigational aid as set fourth in claim 1, wherein said arrowhead, of said variable disk, cooperating with said bearing disk, and said boat disk cooperating with a course heading, sandwiching said predetermined numerical calculation, which then being applied to said graduated scale, on said boat disk, whereby providing visual assessment of said course heading, said apparent wind direction, and a sailing vessel's boom/mainsail angle.

4. A navigational aid comprising four completely transparent, overlayed, relatively thin, flat, circular disks of varying size, being secured together by a means that allows rotatability about a common axis independently, retaining said disks in a juxtaposed, concentric relation;

a. a first disk, a bearing disk, is marked indicative of a nautical compass, comprising a peripheral scale graduated in degrees;

b. a second disk, a variable disk, being of a lesser diameter than said bearing disk, is inscribed with a plurality of markings on a periphery, comprising an arrowhead, indicating apparent wind direction, 40° on either side of said arrowhead are fifty-seven equal dividing lines perpendicular to said periphery, which are further divided diametrically in half, providing fifty-six spaces each containing two semi-identic areas, comprised of an upper circumferential row, and a lower circumferential row, said upper circumferential row accommodating a predetermined numerical calculation, said predetermined numerical calculation means factored variations of transitioning boom/mainsail angles to apparent wind ratios;

c. a third disk, a boat disk, being of a lesser diameter than said variable disk, is inscribed on the surface with a delineation comprising a hull of a sailboat, a bow that culminates at a bowsprit, which terminates at said boat disk's periphery, indicating 0° of a 360° circle, further inscriptions, on said periphery, include a graduated scale in degrees commencing at 90° and terminating at 270°;

d. a fourth disk, a boom/mainsail disk, bears a depiction of a boom/mainsail emanating from said common axis, typifying a sailboat's mast, said common axis means having a central point that provides a means for alignment to a current bearing, whilst said bearing disk aligns with a True or Magnetic North on a navigational chart (not shown), incorporating two or more embodiments into said navigational chart.

5. The navigational aid as set forth in claim 2, wherein rotation of said arrowhead to appropriate positioning provides an operator with a visual apparent wind direction, on said navigational chart, to aid in avoidance of navigational hazards, or other nautical anomalies.

6. The navigational aid as set forth in claim 2, wherein alignment of said bowsprit, or said boom/mainsail depiction, to a land-mark, on said navigational chart, provides an operator a bearing of an approximate degree, viewable on said bearing disk, to assist said operator in a determination of a line of position, as when point fixing.

7. The navigational aid as set forth in claim 2, wherein alignment of said disks, on said navigational chart provide visual confirmation of an intended destination to an operator, thus increasing functionality of said navigational chart.

8. The navigational aid as set forth in claim 2, wherein said lower circumferential row means providing a means for inscribing individual variations from said predetermined numerical calculations, giving consideration to variance in point of effort, and sail design.

9. In a navigational aid of the type comprising three overlayed, relatively thin, flat, circular disks of varying size, being secured together by a means that allows rotatability about a common axis independently, retaining said disks in a juxtaposed, concentric relation;

a. a first disk, a variable disk, is inscribed with a plurality of markings on a periphery, comprising an arrow-head to indicate apparent wind direction, 40° on either side of said arrowhead are fifty-seven equal dividing lines perpendicular to said periphery, which are further divided diametrically in half, providing fifty-six spaces, each space containing two semi-identic areas, comprised of an upper circumferential row, and a lower circumferential row, said upper circumferential row accommodating a predetermined numerical calculation, said predetermined numerical calculation means factored variations of transitioning boom/mainsail angles to apparent wind ratios;

b. a second disk, a boat disk, being of a lesser diameter than said variable disk, is inscribed on the surface with a delineation comprising a hull of a sailboat, a bow that culminates at a bowsprit which terminates at said boat disk's periphery indicating 0° of a 360° circle, further inscriptions on said periphery include a graduated scale, in degrees, commencing at 90° and terminating at 270°;

c. a third disk, a boom/mainsail disk, bears a depiction of a boom/mainsail emanating from said common axis, typifying a sailboat's mast.

10. The navigational aid as set forth in claim 3, wherein alignment of said arrowhead with apparent wind, and said boat disk with desired course heading, said predetermined numerical calculation indicated by said bowsprit, provides boom/mainsail angle to necessitate said desired course heading.

* * * * *